United States Patent [19]
Johnson

[11] Patent Number: 4,807,347
[45] Date of Patent: Feb. 28, 1989

[54] METHOD AND TOOL FOR REWINDING A RECOIL STARTER SPRING

[76] Inventor: George H. Johnson, 1242 Broad St., Augusta, Ga. 30901

[21] Appl. No.: 219,609

[22] Filed: Jul. 15, 1988

[51] Int. Cl.[4] .......................... B23P 6/00; B23P 19/04
[52] U.S. Cl. .................................. 29/402.01; 29/228; 29/402.08; 123/185 BA; 185/45; 242/96
[58] Field of Search ................ 29/402.01, 402.03, 228, 29/240, 240.5, 402.08, 446; 123/185 A, 185 B, 185 BA, 185 BB; 242/96; 185/45

[56] References Cited

U.S. PATENT DOCUMENTS 1,676,704 7/1928 Odom .................................. 29/228
1,790,218 1/1931 Appleby ............................... 29/228
3,748,716 7/1973 Fidler .................................. 29/228
4,036,084 7/1977 Schirmer ......................... 29/228 X
4,183,268 1/1980 Anderson ............................ 29/228
4,662,477 5/1987 Minoru ................................ 185/45

*Primary Examiner*—Timothy V. Eley
*Assistant Examiner*—Andrew E. Rawlins
*Attorney, Agent, or Firm*—James A. Hinkle

[57] ABSTRACT

A tool for rewinding the recoil starter spring within a recoil starter mechanism for a small engine which allows the repair person to rewind the spring with a minimum of trouble and without the danger of the spring flying out of the central spring receiving recess of the starter pulley.

6 Claims, 2 Drawing Sheets

METHOD AND TOOL FOR REWINDING A RECOIL STARTER SPRING

BACKGROUND OF THE INVENTION

I. Field of the Invention

The present invention relates generally to a tool for working on a small internal combustion engine. More particularly, the invention pertains to a tool which small engine machanics will use for rewinding a new replacement recoil starter spring for a recoil starter mechanism. Typically, such a recoil starter spring performs the rewinding of a starter cord after the cord has been pulled by the operator when starting a small engine.

II. Description of the Prior Art

Small engines are well known and are commonly used on lawn mowers and garden tractors and on a variety of other garden and lawn maintenance implements in addition to being used in other environments. Typically, each of these engines will be equipped with a recoil starter system comprising a rope which spins a starter mechanism to engage a fly wheel which is attached to the engine for starting purposes. Once the rope starter has been pulled, a recoil mechanism is invariably provided with the engine to coil the starter cord back into the starting mechanism. The recoil portion of the starting mechanism is operated by an elongated flat metal spring which is tensioned as the starter cord is pulled by the operator. Once the cord has been fully pulled, it is then released by the operator and the recoil starter mechanism will, in turn, rewind the cord by action of the tensioned spring unwinding.

Frequently, the rewinding spring will fail thus necessitating disassembly of the recoil rewinding mechanism and replacement of the spring.

In the past, replacing the spring has been a tedious job because the operator needs to hold the spring in its recessed cavity within the recoil starter pulley and then effect the winding of the spring into the pulley mechanism while maintaining it in a coiled position and under adequate tension. Such a procedure requires not only skill, but at times, infinite patience. To date, no truly practical device has been available to assist a mechanic in rewinding such a recoil starter spring.

SUMMARY OF THE INVENTION

It is therefore an object of the present invention to provide a tool for use by small engine mechanics wherein a recoil starter spring may be easily replaced after the previous spring has failed or has undergone repair.

Another object of the invention is to provide a method of replacement of a recoil starter spring in a small engine which provides rapid replacement by the mechanic.

Yet another object of the invention is a method of replacement of a recoil starter spring in a small engine which provides a quick and efficient method of replacement and eliminates the tedium known in the prior art of such replacement.

Yet another object of the invention is to provide a tool for the replacement of a recoil starter spring in a small engine that is safe and efficient.

Other objects, advantages and capabilities of the invention will become apparent from the following description taken in conjunction with the accompanying drawings, showing only a preferred embodiment of the invention.

DESCRIPTION OF THE PREFERRED EMBODIMENT

Figure 2:
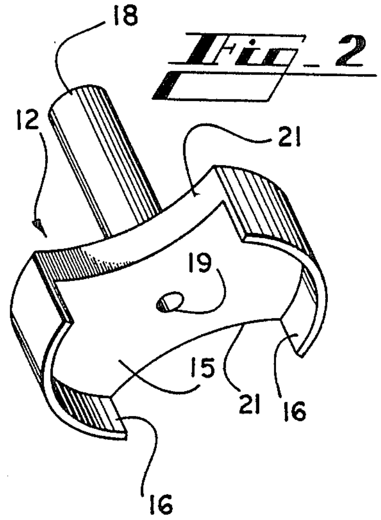
FIG. 2 is a perspective view looking at the bottom surface of the spring cover.
Figure 1:
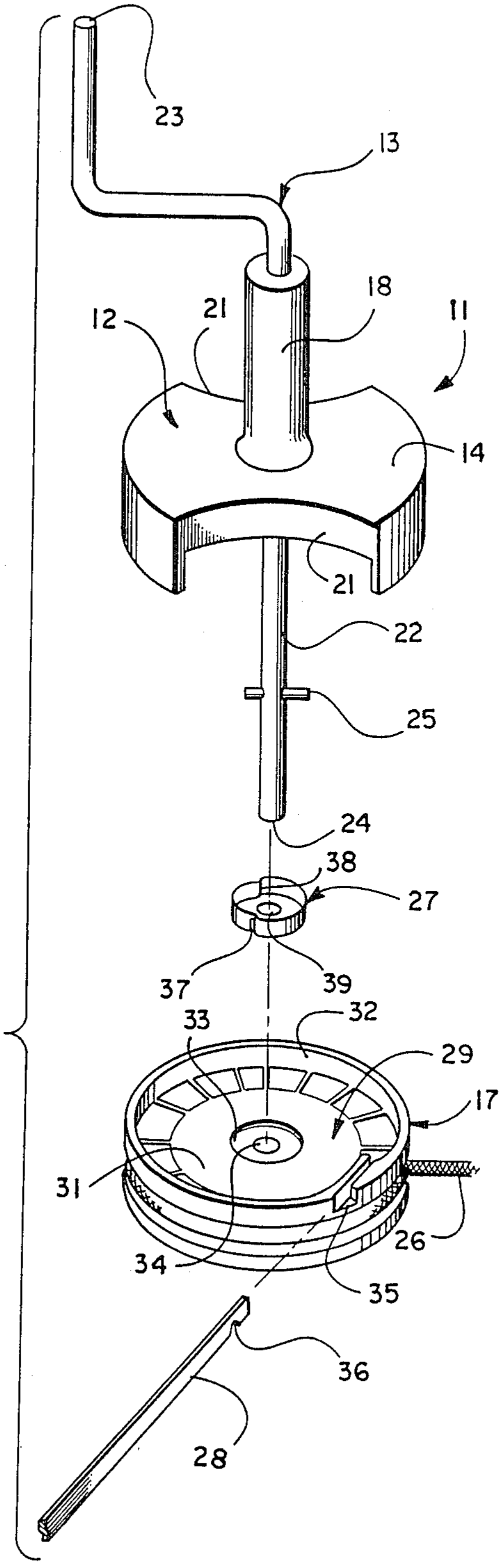
FIG. 1 is an exploded perspective view of the tool for rewinding a recoil starter spring of the present invention.
Figure 3:
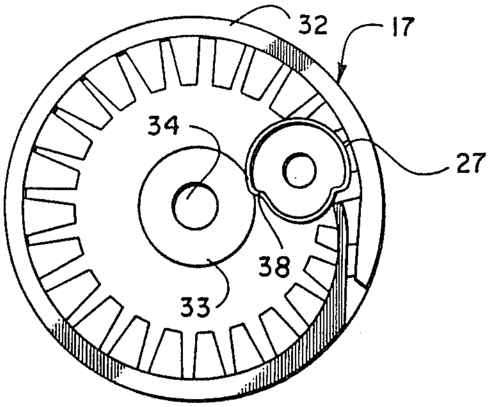
FIG. 3 is a top view of the recoil starter pulley showing the first step in preparation of rewinding thereinto a new recoil spring.

Referring to the drawings where like reference numerals designate corresponding parts through the several figures, the spring winding tool is indicated by numeral 11. As seen in FIG. 1, the spring winding tool 11 is shown with certain parts which are common to the typical recoil starting mechanism of a small engine.

More specifically, the spring winding tool 11 comprises two major subassemblies, namely, a spring cover 12 and and a crank handle 13. The spring cover 12 is configured as a circular cup having an upper surface 14 and a lower surface 15. A depending edge 16 is provided from the lower surface which is of sufficient depth to overlap the outside of the recoil starter pulley 17.

Projecting from the upper surface 14 is a crank handle bushing 18 which is situated on the upper surface in the center of the spring cover. Located centrally in the handle shaft, is a crank handle aperture 19 which projects through both the handle shaft and the spring cover. When winding a spring into the recoil starter pulley 17, it is advantageous that the operator be able to see the spring being so wound and to be able to maintain finger pressure against the spring to permit it to be wound in an orderly manner. To this purpose, the spring cover 12 is provided with a pair of opposed semi-circular cutouts 21 which provide viewing and manipulative access past the spring cover starter pulley 17.

The crank handle 13 comprises a shaft 22 which has a proximal end 23 and a distal end 24. Nearer to the proximal end than the distal end, the handle is crank configured to allow the operator to impart a cranking action to the shaft 22. Near the distal end of the shaft is a spring anchor engagement pin 25. Prior to placing the engagement pin 25 through a receiving aperture in the shaft 22, the distal end of the shaft is placed through the uppermost portion of the handle bushing 18 and fitted through the bushing to the lower surface 15 of the spring cover. At this point, the spring anchor engagement pin 25 is then placed through a receiving aperature (not shown) in the shaft. As can be seen in FIG. 1, the spring anchor engagement pin 25 is placed assymmetrically within the shaft so that one end of the pin extends beyond the shaft further than the other end.

In order to utilize the spring winding tool 11 with the generally available parts of a small engine, the operator would utilize several existing parts, namely, the recoil starter pulley 17, the starter cord 26, the spring anchor 27 and the recoil spring 28. When utilizing the present invention, the operator would generally remove the recoil starter pulley 17 and its associated attached gearing from the small engine so that the rewinding operation may take place with the minimum of equipment being removed from the engine.

The typical recoil starter pulley assembly 17 normally includes the circular wheel-like mechanism as is shown in FIG. 1. The pulley itself comprises a spring cavity 29 which defines the area in which the recoil spring 28 is wound. The cavity is defined by the floor 31 and the side wall 32 which join together forming the spring cavity 29. Centrally located within the floor 31 is a spring anchor recess 33 which is designed to accomodate the spring anchor 27 in mating engagement. In the center of the floor is an aperture 34 which is adapted to receive the shaft 22 of the spring winding tool. Within the exterior portion of the side wall 32, a groove is milled into the recoil starter pulley to house the starter cord 26 in the accepted fashion. Also, in the uppermost portion of the side wall 32, a spring guide slot 35 is provided (in the standard starter pulley model) which will be adapted to receive the recoil spring 28 in a manner to be described.

In the exploded view of FIG. 1, it can be seen that due to its long length, the typical recoil spring is only shown in a broken-away portion. At the proximal end of the spring, however, a locking notch 36 is provided to matingly engage with spring locking slot 37 of the spring anchor 27. The purpose of the locking notch is to fit into the spring locking slot 37 and to lock into the slot so that the spring will be wound inside the spring cavity by action of the spring anchor. Another important feature of the spring anchor is the provision of a shoulder 38 which is designed to receive the spring anchor engagement pin 25 in order to rewind the recoil spring in the intended mode.

Figure 4:
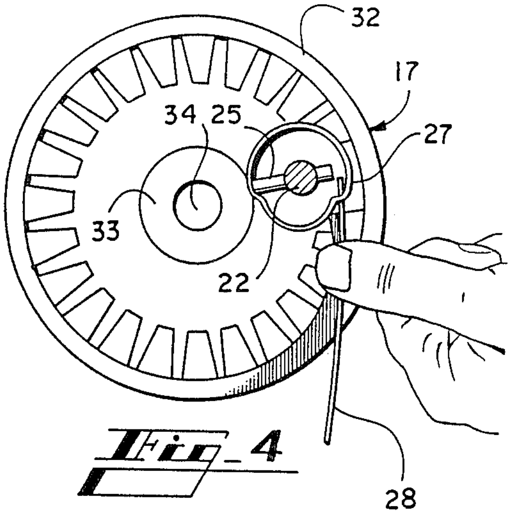
FIG. 4 is a top view of the recoil starter pulley showing the second step in winding a new recoil spring.

The proximal end locking notch 36 of the recoil spring has been described as being designed to engage the spring locking slot 37 of the spring anchor. A second locking notch is provided (not shown) at the distal end of the recoil spring for the purpose of being placed in locking engagement with a spring guide slot 35 when the spring is fully wound. FIGS. 3 through 7 show the procedure by which the operator would effect the winding of the recoil spring within the confines of the spring cavity 29 of the recoil starter pulley 17. The operator would first take the spring anchor 27 and place it in the position shown in FIG. 3. Then, the recoil spring 28 would be threaded through the spring guide slot 39 and the locking notch 36 would be placed in the spring locking slot 37 of the spring anchor. The open cup end of the spring anchor 27 would be facing toward the operator so as to provide access for the spring winding tool 11. FIG. 4 shows the recoil spring engaged with the spring anchor and the distal end 24 of shaft 22 of the winding tool would then be placed in the spring anchor aperture 39 to begin the winding procedure.

Figure 5:
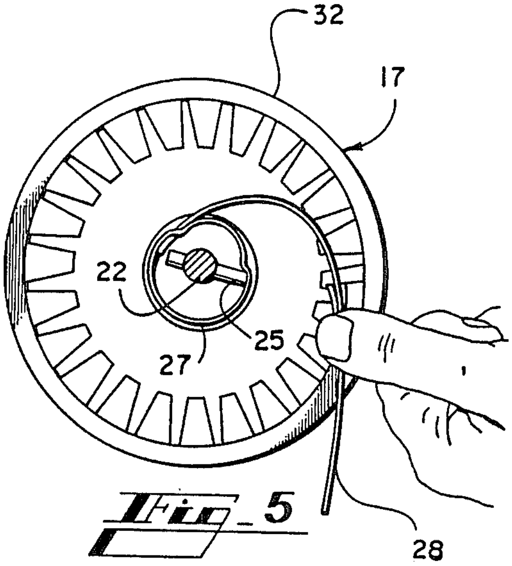
FIG. 5 is a top view of the recoil starter pulley showing the third step in winding a new recoil spring.
Figure 6:
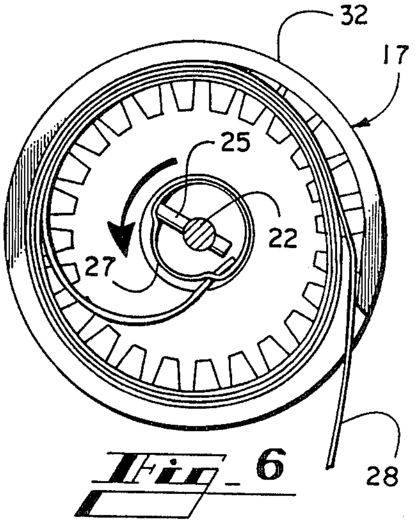
FIG. 6 is a top view of the recoil starter pulley showing the fourth step in winding a new recoil spring.
Figure 7:
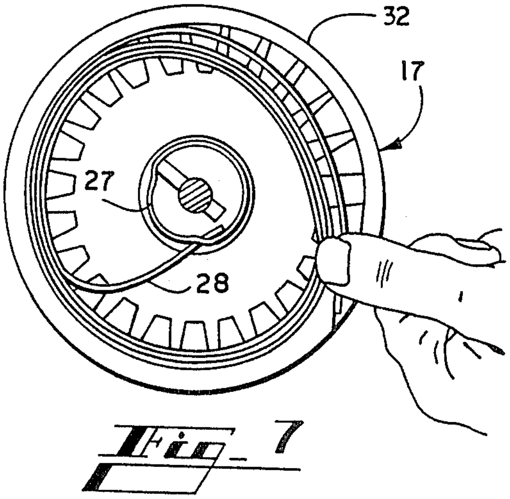
FIG. 7 is a top view of the recoil starter pulley showing the fifth step in winding a new recoil spring.

The operator would then position the spring anchor 25 with the shaft 22 over the aperture 34 of the pulley in the manner shown in FIG. 5. The winding tool shaft 22 would then be inserted into aperture 34 of the pulley thus, positioning the spring anchor in recess 33 and fully engaging a spring anchor engagement pin 25 with shoulder 38. This allows a positive pressure to be put upon the spring anchor and the recoil spring. At this point, the operator would then wind the crank handle 13 in a counter-clockwise manner as shown in FIG. 6 and would maintain his thumb over the spring guide slot 35 in order to feed the spring into the pulley. It should be noted at this point, that the spring cover 12 has been previously placed over the recoil starter pulley prior to the spring being wound. This allows the spring to be confined within the spring cavity 29 and allows the operator to keep a hand free for guiding the spring into the spring guide slot. Of course, one of the semi-circular cutouts of the spring cover would be placed over the spring guide slot to give access to the operator's thumb. The other cover would be on the opposite side of the spring cover to allow the operator to observe the winding process through the other spring cavity.

Once the spring is almost fully wound, the operator would gingerly continue to crank the crank handle 13 in a counterclockwise direction thus, drawing the distal end locking notch of the recoil spring to the spring guide slot. When the distal end locking notch travels into the spring guide slot it will impinge upon a detent (not shown) and become firmly engaged therewith. This will complete the winding operation and the operator will carefully remove the spring winding tool from the spring anchor which allows the recoil starter pulley to then be replaced in the small engine. Of course, when the winding tool is removed, the spring anchor becomes free of the tool but will remain in the spring anchor recess 33 to be subsequently engaged with other operative parts of the recoil mechanism of a small engine.

Various modifications may be made of the invention without departing for the scope thereof and it is therefore desired that only such limitations shall be placed thereon as are imposed by the prior art and which are set forth in the appended claims.

What is claimed is:

1. A tool for effecting repair upon a small engine, said engine being of the type having a self-winding recoil starter mechanism which includes a recoil starter pulley having a central aperture and a central spring receiving recess, an elongated flat recoil spring having a proximal end and a distal end, the proximal end having a locking notch therein, a spring anchor means adapted to overly the central portion of the pulley, the spring anchor means having generally a hollow cylindrical configuration with a through aperture at one end thereof and the other end being open to the full extent of the cylinder, the spring anchor means further having a shoulder portion projecting into the interior of the cylinder and having a spring locking slot positioned in the cylinder side wall, the tool further comprising:

a substantially hollow cylindrical spring cover, one end of the cylindrical cover being open and the other end being closed, the closed end having an aperture centrally located therein, a crank handle means comprising an elongated tubular handle shaft and having a proximal end and a distal end, the distal end of the shaft being positioned through the central aperture of the spring cover.

means to engage the distal end of the handle shaft in operative relationship with the spring anchor means, whereby the locking notch of the proximal end of the recoil spring is placed within the central spring receiving recess of the starter pulley and engaged in the spring locking slot of the spring anchor means and the crank handle shaft is matingly engaged with the spring anchor means by projecting the shaft through the spring anchor means and through the central aperture of the starter pulley thereby engaging the engagement pin of the handle shaft with the shoulder of the spring anchor wherein when the proximal end of the crank handle is rotated the recoil spring is wound into a spring coil within the central spring receiving recess of the starter pulley and maintained therein by the spring cover until fully wound therein and ready for use upon the small engine.

2. The tool as claimed in claim 1, said tool further comprising a spring cover having depending side walls of such interior dimension so as to be adapted to overly the recoil starter pulley, the closed end of the spring cover having opposed cutout portions allowing viewing the interior of the spring cover.

3. The tool as claimed in claim 2, said tool further comprising a handle bushing attached to the closed end of the spring cover and being in axial alignment with the aperture of the closed end, the bushing having an elongated length projecting from the closed end of the spring cover.

4. The tool as claimed in claim 4, said tool further comprising the handle shaft being adapted to be placed through the handle bushing to project the distal end thereof through the spring cover.

5. The tool as claimed in claim 5, said tool further comprising a spring anchor engagement pin projecting through the handle shaft and located transversely to the longitudinal length of the handle shaft, the anchor pin being adapted to matingly engage with the shoulder portion of the spring anchor means.

6. A method for effecting repair upon a small engine wherein the engine is of the type having a self-winding recoil starter mechanism including a recoil starter pulley having a central aperture and a central spring receiving recess and having an elongated flat recoil spring with a proximal end and a distal end, the proximal end of the spring having a locking notch therein, a spring anchor means adapted to overly the central portion of the pulley, the spring anchor means having generally a hollow cylindrical configuration with a through aperture at one end thereof and the other end being open to the full extent of the cylinder, the spring anchor further having a shoulder portion projecting into the interior of the cylinder and having a spring locking slot positioned in the cylinder side wall, the method comprising:

placing the spring anchor means within the central spring receiving recess of the starter pulley, inserting the locking notch of the proximal end of the flat recoil spring into the spring locking slot thereof, inserting a distal end of a tubular shaft of a crank handle in the through aperture of the spring anchor means, moving the shaft, anchor means and the attached recoil spring to the central aperture of the recoil starter pulley, inserting the distal end of the handle shaft through the anchor means and the central aperture of the starter pulley, positioning a spring anchor engagement pin attached to the shaft handle into the spring anchor means and positioning the spring anchor engagement pin against the shoulder portion of the spring anchor means, providing the handle shaft with a substantially hollow cylindrical spring cover being open at one end thereof and enclosed at the other end thereof, positioning the spring cover centrally about the handle shaft, positioning the spring cover over the central spring receiving recess of the recoil starter pulley to maintain the recoil spring within the spring receiving recess, turning the crank handle and winding the recoil spring around the spring anchor means within the central spring receiving recess of the starter pulley until the spring is fully wound within the receiving recess and locked in position, removing the winding tool from the spring anchor means and the recoil starter pulley leaving the recoil spring wound in operative position.

* * * * *